United States Patent [19]

Kirby

[11] Patent Number: 4,764,145
[45] Date of Patent: Aug. 16, 1988

[54] WILDLIFE CALL

[76] Inventor: Richard C. Kirby, 6426 W. Quaker Rd., Orchard Park, N.Y. 14127

[21] Appl. No.: 881,616

[22] Filed: Jul. 3, 1986

[51] Int. Cl.$^4$ .................. A63H 33/40; A63H 5/00; G01D 7/00
[52] U.S. Cl. ................................ 446/208; 446/202; 84/330
[58] Field of Search .............. 446/222, 209, 202, 204, 446/205, 207, 208, 213, 214, 216, 188, 176, 397, 415, 416; 84/330; 43/1, 2, 3

[56] References Cited

U.S. PATENT DOCUMENTS

| 752,447 | 2/1904 | Gebert | 446/209 |
|---|---|---|---|
| 888,311 | 5/1908 | Converse | 446/209 |
| 1,353,864 | 9/1920 | Thomassian | 446/209 |
| 2,256,925 | 9/1941 | McCoy | 446/202 |
| 2,296,786 | 9/1942 | Hoeflich | 446/209 |
| 2,590,743 | 3/1952 | Wintriss | 446/207 |
| 2,969,611 | 1/1961 | Warren, Jr. | 446/202 |
| 3,583,094 | 6/1971 | Tribell | 446/202 |
| 3,722,133 | 3/1973 | Morgan | 446/202 |
| 4,483,097 | 11/1984 | Piper | 43/2 X |

Primary Examiner—Robert A. Hafer
Assistant Examiner—D. Neal Muir
Attorney, Agent, or Firm—Christel, Bean & Linihan

[57] ABSTRACT

A wildlife call including a hollow tube having an open sound-escape end and an opposite open mouthpiece includes a resonating membrane associated with the mouthpiece which is arranged in a planar condition and oriented at an acute angle to the longitudinal axis of the mouthpiece. For support of the membrane in such an arrangement, the mouthpiece includes a head portion which protrudes axially of the tube and opposite the sound-escape end and which defines a continuous edge that bounds a substantial portion of the opening of the mouthpiece when the mouthpiece is viewed axially and theretoward. The mouthpiece further includes an end wall covering a substantial portion of the mouthpiece opening not covered by the continuous edge, arranged generally within a radial plane of the tube, and defining a substantially free edge extending across the mouthpiece. The resonating membrane is thus arranged angularly to the plane of the end wall. The resonating membrane is secured to the tube in a planar condition across the continuous edge so as to span a major section of the portion of the mouthpiece opening bounded by the continuous edge and so as to define a free edge extending across the mouthpiece from about one end of the continuous edge to the other. The free edge of the membrane and the free edge of the end wall cooperate with one another to define opposing sides of an opening for the call.

23 Claims, 2 Drawing Sheets

WILDLIFE CALL

BACKGROUND OF THE INVENTION

This invention relates generally to sound-producing devices and relates more particularly to a call for imitating sounds of various wildlife.

The type of call with which this invention is concerned includes a hollow tube having a resonating membrane associated with one end thereof. The tube end with which the membrane is associated commonly serves as the mouthpiece end of the call while the other or opposite end of the tube provides the sound-escape end of the call. To use such a call, the mouthpiece end is placed to the lips of the user and the user subsequently voices or otherwise introduces sounds into the tube. The sounds introduced into the mouthpiece end are magnified by a vibrating action of the membrane and directed out of the sound-escape end of the tube. A call of the aforedescribed type is commonly referred to as a tube call, and examples of such calls are shown and described in U.S. Pat. Nos. 2,969,611, 3,722,133 and 3,811,221.

A limitation of tube calls such as have been described in the referenced patents relates to the positional relationship required between the user's lips and the call membrane during the operation of the call. With regard to structure, the mouthpiece of each call described in the referenced patents has a shape resembling open end portion of a right cylinder with the call membrane positioned across so as to span about one-half of the substantially planar mouthpiece end. such a structure renders awkward the obtaining and maintaining of the user's lips in a comfortable and operative relationship with the membrane for use of the call, and such awkwardness renders difficult the obtaining of quality sound reproductions with and thereby reduces the general effectiveness of the call.

It has been found that calls of the referenced patents can be used with a reduction in user discomfort and an increase in effectiveness by positioning the mouthpiece of the call in a canted or generally upwardly-directed orientation in relationship to the user's mouth so that the upper lip of the user rests upon one side of the mouthpiece and the lower lip spans and is positioned proximate to the membrane positioned across the mouthpiece end. However, such a canted orientation necessarily directs sounds emitted from the sound-escape end generally upwardly and, as a result, is believed to reduce the effective range of the call.

It is an object of the present invention to provide a new and improved call of the aforedescribed type.

Another object of the present invention is to provide such a call having a mouthpiece which fits comfortably between the lips of a user and facilitates effective operation of the call.

Still another object of the present invention is to provide such a call having a relatively long range of effectiveness and a desirable capacity for imitating wildlife sounds.

Yet still another object of the present invention is to provide such a call having a membrane which can be removed for purposes of cleaning or replacement with relative ease.

A further object of the present invention is to provide such a call which is economical to manufacture and effective in operation.

SUMMARY OF THE INVENTION

This invention resides in a new and improved wildlife call including a hollow body having an open sound-escape end and an opposite open mouthpiece and a resonating membrane associated with the mouthpiece of the call body.

the improvement of the call is characterized in that the mouthpiece of the call body includes means defining a head portion protruding generally axially of the mouthpiece opposite the sound-escape end of the call body and across which the resonating membrane extends and means defining an end wall positioned adjacent the head portion. The head portion defines a continuous edge which bounds a substantial portion of the mouthpiece opening when the mouthpiece is viewed endwise and toward the mouthpiece and which terminates at two opposite ends located generally on opposite sides of the mouthpiece. The end wall covers a substantial portion of the mouthpiece not bounded by the continuous edge and defines a substantially free edge extending across the mouthpiece. The resonating membrane operatively extends across the continuous edge of the head portion so as to span a major section of the portion of the mouthpiece opening bounded by the continuous edge and so as to define a free edge extending across the mouthpiece from about one end of the continuous edge to the other and so as to be generally arranged in an acute angular relationship with the longitudinal axis of the mouthpiece. The free edge of the end wall and the free edge of the membrane cooperate with one another to define opposing sides of an opening for the call.

It has been found that the head portion of the call supporting the membrane in a angular relationship as aforesaid and the defined end wall cooperate to enhance the comfort of the user's lips during the use of the call and facilitates the imitation of desired wildlife calls with the call.

BRIEF DESCRIPTION OF THE DRAWING FIGURES

DETAILED DESCRIPTION OF AN ILLUSTRATIVE EMBODIMENT

Figure 1:
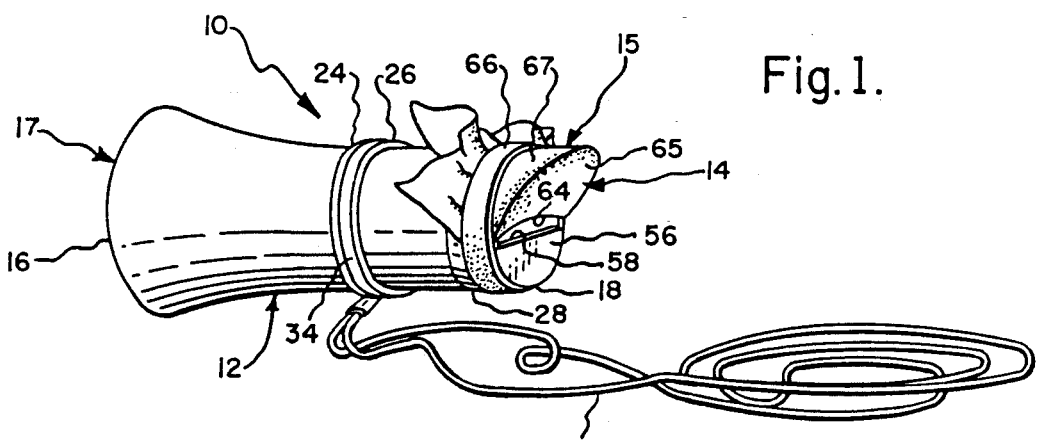
FIG. 1 is a perspective view of an embodiment of the call of this invention.

Turning now to the drawings in greater detail and considering first FIG. 1, there is shown an embodiment, generally indicated 10, in accordance with the present invention. The call 10 includes means defining a hollow, elongated tube body 12 having two opposite, open end portions 16,18 and means defining a resonating membrane 14 retainably secured across one end portion 18 of the tube 12 so that the tube end portion 18 and the membrane 14 collectively provide the mouthpiece end, generally indicated 15, of the call 10. The other tube end portion 16 provides a sound-escape end, generally indicated 17, of the call 10. As will be described in greater detail hereinafter, the mouthpiece end 15 is so constructed that the user-comfort and the wildlife sound-imitating quality and the effective range of the call 10 is enhanced.

Figure 2:
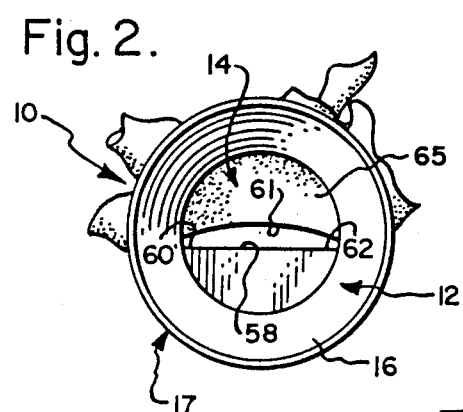
FIG. 2 is an end view of the FIG. 1 call as seen generally from the left in FIG. 1.

The tube 12 is relatively thin-walled and constructed of a durable rigid material, such as a hard plastic. It has been found that hard plastic reflects more and absorbs less sound than wood and is therefore preferred over wood as a material of construction. It will be understood, however, that the call 10 can be constructed of wood or other less sound-reflective materials in accordance with the broader aspects of this invention. The tube end portion 16 providing the sound-escape end 17 is in the form of a radially outwardly-flared bell as shown in FIGS. 1 and 2 so that the largest diameter of the end portion 16 as measured across any cross-sectional, or radial, plane thereof is the largest across the sound-escape end 17. For a reason which will be apparent hereinafter and with reference to FIGS. 1 and 4, the tube 12 defines an annular protuberance 28 spaced from and adjacent the mouthpiece end 15 of the call 10. The protuberance 28 defines a shoulder 30 generally arranged in a radial plane of the tube 12 and facing axially of the tube 12 toward the mouthpiece end 15.

Intermediate of the tube end portions 16 and 18 is defined a pair of closely-spaced annular ribs 24,26. A neck strap 32 in the form of a loop of string or suitable cord has a section 34 which is positioned between the ribs 24,26 and tied about the tube 12 so that movement of the strap section 34 relative to and in an axial direction of the tube 12 is limited by the ribs 24 and 26.

Figure 4:
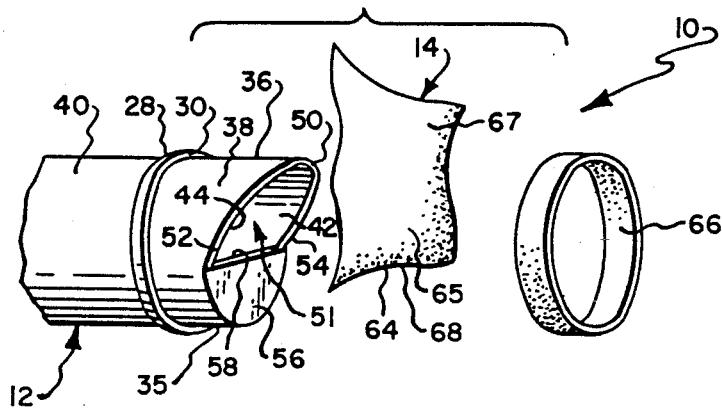
FIG. 4 is a fragmentary perspective view, shown exploded, of the mouthpiece end of the FIG. 1 call.
Figure 5:
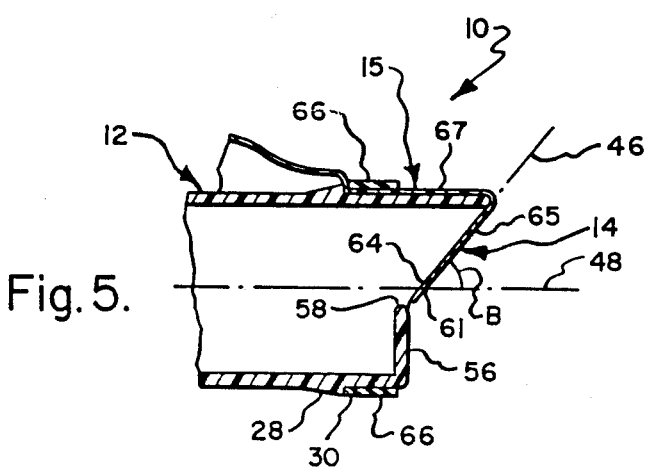
FIG. 5 is cross-sectional view of a fragment of the FIG. 1 call taken about on line 5—5 of FIG. 3.

In accordance with the present invention and with references to FIGS. 1-3 and 5, the tube mouthpiece or tube end portion 18 includes a tubular base 35 and a head portion 36 connected to the base 35 which extends generally axially of the tube 12 and in a direction opposite and sound-escape end 17. As best shown in FIG. 4, the head portion 36 defines an arcuate outer surface 38 which is a continuous extension of the outer surface, generally indicated 40, of the tube 12 and defines an inner surface 42 which is a continuous extension of the inner surface, indicated 44, of the tube 12. As best shown in FIG. 5, the head section 36 extends generally axially of the tube 12 and terminates in a plane, indicated 46, defining an acute angle B (i.e., less than ninety degrees) with the longitudinal axis, indicated 48, of the tube 12. In the call embodiment shown, the plane 46 forms an acute angle of about forty-five degrees with the plane 48 but it is believed that any acute angle within the range of about fifteen to seventy-five degrees provides a well-suited relationship between the plane 46 and the axis 48 for purposes of this invention. The head portion 38 thus terminates in and defines a continuous edge 50 which is contained generally within a plane oriented angularly to the longitudinal axis 48 of the tube 12.

With reference again to FIG. 4, the head portion 38 is of such size in relationship to the mouthpiece 18 of the tube 12 that the continuous edge 50 generally bounds a substantial portion of the opening, indicated 51, of the mouthpiece 18 when the tube is viewed endwise and toward the mouthpiece 18. More specifically, the continuous edge 50 bounds or partially encircles about one-half of the projected area of the mouthpiece 18 when the tube 12 is viewed endwise and toward the mouthpiece 18. Accordingly, the continuous edge 50 terminates at two opposite ends, indicated 52 and 54 in FIG. 4, which are positioned at generally diametrically opposed locations across the mouthpiece 18.

In further accordance with the present invention and with reference again to FIGS. 4 and 5, the mouthpiece 18 of the tube 12 includes means defining an end wall 56 covering a substantial portion of the opening 51 of the mouthpiece 18 not bounded by the continuous edge 50. As best shown in FIG. 5, the end wall 56 of the call 10 is arranged generally within a radial plane of the tube 12 or, in other words, within a plane oriented perpendicular to the longitudinal axis 48 of the tube 12. Furthermore, the end wall 56 spans a substantial portion of the opening of the mouthpiece 18 so as to define a substantially free straight edge 58 which extends across the mouthpiece 18. The free edge 58 defines opposite ends 60,62 which are each spaced from and in close proximity to a corresponding one of the ends 52,54 of the continuous edge 50. When using the call 10 in a preferred method of use, as will be described in greater detail hereinafter, the end wall 56 provides an abutment surface or lip rest for the lower lip of a user. As a lip rest, therefore, it is not critical to the broader aspects of the present invention that the end wall 56 be oriented in a radial plane of the tube 12 and can instead define with the longitudinal axis 28 an acute angle.

Figure 3:
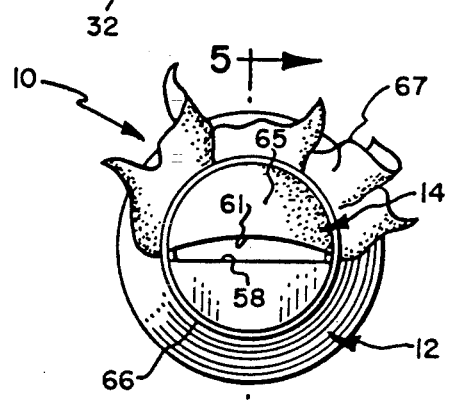
FIG. 3 is an end view of the FIG. 1 call as seen generally from the right in FIG. 1.

With reference to FIGS. 1 and 3-5, the resonating membrane 14 is in the form of a relatively thin piece of elastomeric material, such as a rubberized material, having at least one straight edge 64. The resonating membrane 14 is releasably attached about the tube head portion 38 so that a portion, or mid-section 65, of the membrane material is retained in a substantially planar condition across the continuous edge 50 as shown in FIGS. 1-3 and 5 and another portion, or section 67 bordering the mid-section 65, is draped along the outer surface 38 of the head section 36. More specifically, the mid-section 65 of the resonating membrane 14 extends across the continuous edge 50 so as to span a major section of the portion of the opening 51 of the mouthpiece 18 bounded by the continuous edge 50 and so that a portion indicated 63, of the membrane edge 64 extends across the mouthpiece opening 51. As best shown in FIG. 3, the membrane edge portion 63 defines a substantially C-shaped arcuate free edge 61 of the membrane 14 which extends across the mouthpiece 18 from locations positioned relatively close to the ends 52,54 of the continuous edge 50 so that the defined C of the free edge 61 opens generally toward the free edge 58 of the end wall 56.

For releasably securing the membrane 14 across the head portion 36 of the tube 12, the call 10 includes an elastomeric member in the form of a rubber band 66 stretched about so as to tightly encircle the base 35 of the mouthpiece 18 and the border section 67 of the membrane 14 draped along the outside surface 38 of the head section 36. To operatively secure the membrane 14 across the head portion 36, the membrane 14 is initially positioned across the continuous edge 50 so that the mid-section 65 of the membrane 14 operatively spans a substantial portion of the opening 51 of the mouthpiece 18 as aforedescribed and so that the border section 67 of the membrane 14 is draped axially of the mouthpiece 18 and along the outer surface 38 of the head section 36. With the border section 67 manually held in the draped condition along the outer surface 38, the rubber band 66 is stretched into place about the base 35 of the mouthpiece 18 and the membrane border section 67 draped thereover. It will be understood that the shoulder 30 of the annular protuberance 38 of the tube 12 provides an abutment surface or stop for the rubber band 66 to limit movement or slippage of the rubber band 66 relative to the tube 12 in one axial direction therealong. To remove the membrane 14, the rubber band 66 is simply slipped over and off of the mouthpiece 18.

Because the membrane 14 is releasably retained upon the mouthpiece 18 with the rubber band 66 in the manner described above, the membrane 14 can easily be removed from the tube 12 for purposes of cleaning or replacement. Such an easy-to-assemble mouthpiece arrangement of the call 10 can be readily appreciated by hunters exposed to cold or otherwise adverse weather conditions and who may desire to replace a worn or torn membrane with a new flexible one.

With reference to FIGS. 1,3 and 5, the arcuate C-shape of the free edge 64 is arranged so as to open generally toward the free edge 58. Furthermore, the membrane free edge 61 and the end wall free edge 58 are spaced from one another as shown in FIGS. 3 and 5 to define an inlet opening, indicated 68, for the call 10. More specifically, each of the wall free edge 58 and the membrane edge 61 defines a corresponding one of two opposing sides of the inlet opening 68. When the call 10 is used, the inlet opening 68 permits air to enter the tube 12 and thereby promote the vibrating action of the membrane 14 as sounds are voiced or otherwise introduced into the call 10.

Figure 6:
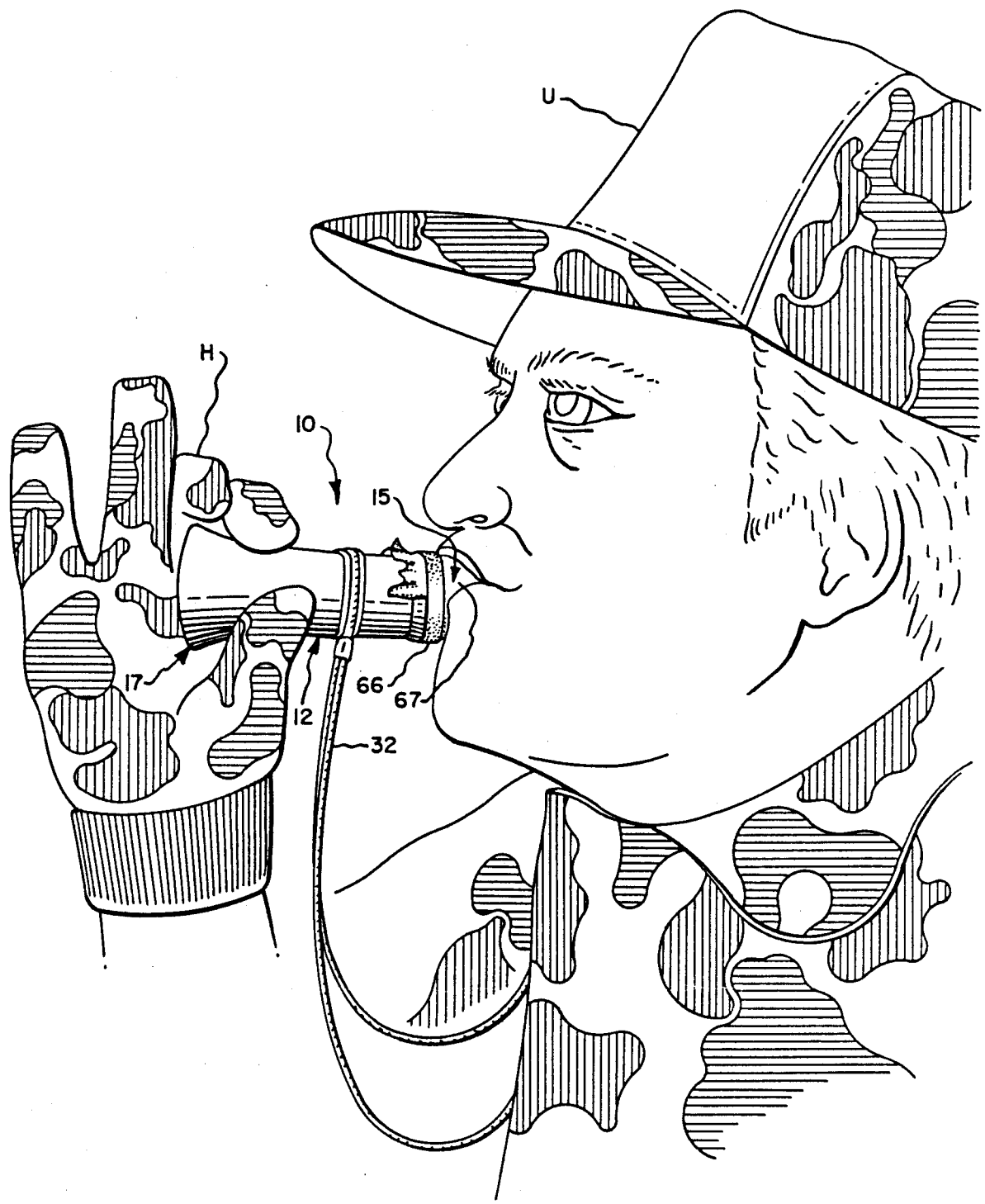
FIG. 6 is a perspective view of the FIG. 1 call in use.

There is illustrated in FIG. 6 a preferred operative placement of the call 10 in the mouth of a user U for using the call 10. More specifically, the tube 12 is held with a hand 14 and the head portion 36 of the mouthpiece 18 is positioned between the user's lips so that the upper lip of the user overlies the membrane border section 67 and the lower lip of the user lightly engages the mid-section 65 of the membrane 14 spanning the continuous edge 50. By voicing appropriate sounds into the mouthpiece end 15 of the call 10 and modifying sounds emitted from the sound-escape end 17 by manipulating the the palm or fingers of the hand H across the sound-escape end 17, accurate imitations of various wildlife sounds can be imitated.

When the call mouthpiece end 15 is operatively positioned within the mouth as shown in FIG. 6 and inasmuch as the membrane border section 67 lies in substantial comformity to the arcuate shape of the head portion outer surface 38 and the membrane mid-section 65 and the end wall 56 are generally flat, the upper lip of the user U rests in an arcuate condition across the surface of the membrane section 67 and the lower lip is generally arranged in a natural, generally straight condition against the membrane mid-section 65 and end wall 56. It has been found that such a mouthpiece construction enhances the comfort of the user's lips when the mouthpiece end 15 positioned therebetween. Furthermore and believed to be due, at least in part, to the fact that the free edge 58 of the end wall 56 maintains a relatively constant spacing with the membrane edge 64 during use, the lower lip of the user U is free to be manipulated to vary the sounds being voiced into the mouthpiece end 15 with no requirement that the lower lip maintain any required positional relationship with the call membrane 14. Thus, the mouthpiece 15 facilitates the effectiveness of the call 10.

Another advantage provided by the call 10 of this invention relates to the relatively long range of effectiveness of the call 10 and the capacity of the call 10 for imitating various wildlife sounds. It is believed that both the range of the call and the sound-imitating qualities of the call are enhanced by the aforedescribed mouthpiece construction and the bell-shaped sound-escape end portion 16.

It will be understood that numerous modifications and substitutions can be had to the aforedescribed embodiments without departing from the spirit of the invention. For example, although the membrane edge 64 of the membrane 14 has been shown and described above as extending generally across the continuous edge 50 from about one end 52 to the other end 54, the membrane 14 can be positioned across the continuous edge 50 so that the membrane edge 64 is spaced a short distance from the ends 52 and 54.

Figure 7:
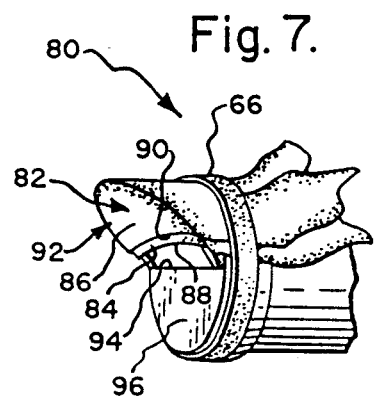
FIG. 7 is a fragmentary perspective view of an alternative embodiment of a call of this invention.

Furthermore, although the membrane 14 of the call 10 has been shown and described above as including a single piece of elastomeric material, a call in accordance with the present invention can have any of a number of membrane layers. For example, there is shown in FIG. 7 an alternative call 80 having a membrane 82 comprised of two layers 84 and 86 of elastomeric material defining edges 88 and 90, respectively, which span the call mouthpiece end, indicated 92. As shown in FIG. 7, layer 86 overlies layer 84 and the edges 88 and 90 are spaced from one another and positioned in spaced relationship with the free edge, indicated 94, of the mouthpiece end wall 96 so that the layer edge 88 is positioned generally between the free edge 94 and the layer edge 90. It has been found that the plurality of membrane layers, such as are included in call 80 of FIG. 7, facilitate the varying of sound tone during use of the call by appropriately manipulating the user's lips relative to the call mouthpiece. Such a tone-varying quality is desirable in a call for imitating some wildlife sounds, such as calls made by a wild turkey. Accordingly, the aforedescribed embodiment 10 of FIGS. 1-6 is intended for the purposes of illustration and not as limitation.

I claim:

1. In a wildlife call including a unitary elongated hollow body having a longitudinal axis, an open sound-escape end and an open mouthpiece defining a mouthpiece opening directed out of the end of the body opposite the sound-escape end, said body being open throughout from said mouthpiece to said sound-escape end, and a resonating membrane associated with the mouthpiece, the improvement characterized in that:

the mouthpiece of the call body includes (a) means defining an arcuate tipped head portion protruding generally axially of the mouthpiece so as to be a linear extension of said hollow body and so that a tip of said head portion is directed generally opposite the sound-escape end, said head portion-defining means also defining a continuous arcuate edge which generally bounds a substantial portion of the arcuate tipped head portion of the mouthpiece when the mouthpiece is viewed endwise and theretoward, said continuous arcuate edge terminating at two opposite ends located generally on opposite sides of the arcuate tipped head portion;

(b) means defining an end wall sealing a substantial portion of the hollow body adjacent the mouthpiece end and defining a free edge extending across said hollow body; and (c) the resonating membrane operatively extends across the continuous arcuate edge so as to span a major section of the hollow body bounded by the continuous arcuate edge and so as to define a free edge extending across the mouthpiece from about one end of the continuous arcuate edge to the other end of the continuous arcuate edge and so as to be arranged generally in an acute angular relationship with the longitudinal axis of said hollow body, said free edge of the end wall and said free edge of the membrane cooperating with one another to define opposing sides of said mouthpiece opening for the call, said membrane being arranged in such a relationship with the hollow body of the call so that the free edge of the membrane is directed generally opposite the tip of the head portion and so that when the tipped head portion is operatively positioned within the mouth of a caller for use with the head portion being overlain by a lip of the caller and the resonating membrane being controllable by the other lip of the caller, the free edge of the membrane is directed generally away from the caller's mouth and the caller is free to manipulate the position of his lip in relation to the resonating membrane during use of the call.

2. The improvement of claim 1 wherein said continuous edge is contained generally within a plane so that said resonating membrane extends across said continuous edge in a planar condition.

3. The improvement of claim 2 wherein said end wall is arranged within a plane oriented in an angular relationship with the plane containing said continuous edge.

4. The improvement of claim 2 wherein said free edge of said end wall is substantially straight and said continuous edge is so arranged in relationship to the end wall that said plane containing said continuous edge is generally parallel to said free edge of said end wall.

5. The improvement of claim 1 wherein said end wall is arranged within a plane.

6. The improvement of claim 5 wherein said plane in which said end wall is arranged is a radial plane of the mouthpiece.

7. The improvement of claim 1 wherein said free edge of said wall extends across so as to substantially bisect said mouthpiece when the mouthpiece is viewed endwise and theretoward.

8. The improvement of claim 1 wherein said free edge of said membrane is arranged in a generally C-shaped arcuate path across the mouthpiece so that the defined C opens generally toward said free edge of said end wall.

9. The improvement of claim 1 wherein each of the opposite ends of said continuous edge is relatively close to said free edge of said end wall.

10. The improvement of claim 1 wherein the hollow body of said call is in the form of a tube and said mouthpiece is an axial extension of said tube.

11. The improvement of claim 1 wherein said call body is comprised of a relatively hard plastic.

12. The improvement of claim 1 wherein said resonating membrane is comprised of an elastomeric material.

13. The improvement of claim 1 wherein said resonating membrane is in the form of a sheet of membrane material having a mid-section which lies in a stretched condition across said continuous edge and a boundary section which is draped axially along and secured to the mouthpiece.

14. The improvement of claim 13 wherein said sheet of material includes a second sheet of membrane material secured to the mouthpiece so as to engagably overlie said first sheet.

15. The improvement of claim 13 wherein said call includes a rubberband-type fastener stretched around so as to tightly encircle the perimetal surface of the mouthpiece and said boundary section of said sheet of membrane material is secured to the call body between the rubberband-type fastener and the perimetal surface of the mouthpiece.

16. A wildlife call comprising:
a unitary elongated hollow body in the form of a tube having a longitudinal axis, two opposite end portions, one of said end portions defining an open end for the outlet of sound emitted from said call and the other of said end portions providing an open mouthpiece for said call wherein said mouthpiece defines an opening directed out of other of said tube end portions and said tube is open throughout from said mouthpiece to said sound-outlet end, said mouthpiece including means defining an arcuate tipped head portion protruding generally axially of the mouthpiece so as to be a linear extension of the all of said tube and so that a tip of said head portion is directed generally opposite the sound-outlet end, said head portion-defining means also defining a continuous arcuate edge which generally bounds a substantial portion of the arcuate tipped head portion of the mouthpiece when the mouthpiece is viewed endwise and theretoward, said continuous arcuate edge being contained generally within a plane oriented at an acute angle to the longitudinal axis of said tube and terminating at two opposite ends located generally on opposite sides of the arcuate tipped head portion, means defining an end wall sealing a substantial portion of the tube adjacent the mouthpiece end, arranged generally within a radial plane of said tube, and defining a substantially free edge extending across said tube; and
means defining a resonating membrane operatively extending in a planar condition across said continuous arcuate edge so as to span a major section of said tube bounded by said continuous arcuate edge and so as to define a free edge extending across the mouthpiece from about one end of the continuous arcuate edge to the other end of the continuous arcuate edge, said free edge of the end wall and said free edge of said membrane cooperating with one another to define opposing sides of said mouthpiece opening, said membrane being arranged in a relationship with said tube of the call so that the free edge of the membrane is directed generally opposite the tip of the head portion and so that when the tipped head portion is operatively positioned within the mouth of a caller for use with the head portion being overlain by a lip of the caller and the resonating membrane being controllable by the other lip of the caller, the free edge of the membrane is directed generally away from the caller's mouth and the caller is free to manipulate the position of his lip in relation to the resonating membrane during use of the call.

17. The call as defined in claim 16 wherein said free edge of said wall extends across so as to substantially bisect said mouthpiece when the mouthpiece is viewed endwise and theretoward.

18. The call as defined in claim 16 wherein said free edge of said membrane is arranged in a generally C-shaped arcuate path across the mouthpiece so that the defined C opens generally toward said free edge of said end wall.

19. The call as defined in claim 16 wherein said one outlet end portion of said tube is in the form of a flared bell having its largest radial diameter being measured across said sound-outlet end.

20. In a wildlife call including a unitary elongated hollow body in the form of a tube having a longitudinal axis, a sound-escape end and an open mouthpiece defining a mouthpiece opening directed out of the end of the tube opposite the sound-escape end, said tube being open throughout from said mouthpiece to said sound-escape end and a resonating membrane associated with the mouthpiece, the improvement characterized in that:

the mouthpiece of the call body includes means defining an arcuate tipped head portion protruding generally axially of the mouthpiece so as to be a linear extension of the wall of said tube and so that a tip of said head portion is directed generally opposite the sound-escape end, said head portion-defining means including a boundary edge which generally bounds a substantial portion of the arcuate tipped head portion of the mouthpiece when the mouthpiece is viewed endwise and theretoward; and the resonating membrane operatively covers only a portion of and extends across the boundary edge so as to span a major section of the arcuate tipped head portion bounded by the boundary edge, to define a free edge of the membrane extending across the mouthpiece and to be generally arranged in an acute angular relationship with the longitudinal axis of the tube, said free edge of the membrane cooperating with the portion of the boundary edge left uncovered by the membrane to define opposing sides of said mouthpiece opening, said membrane being arranged in a relationship with said tube of the call so that the free edge of the membrane is directed generally opposite the tip of said head portion and so that when the tipped head portion is operatively positioned within the mouth of a caller for use with the head portion being overlain by a lip of the caller and the resonating membrane being controllable by the other lip of the caller, the free edge of the membrane is directed generally away from the caller's mouth and the caller is free to manipulate the position of his lip in relation to the resonating membrane during use of the call.

21. The improvement of claim 20 wherein at least said substantial portion of said boundary edge is contained generally within a plane and said resonating membrane extends across said boundary edge in a planar condition.

22. The improvement of claim 21 wherein said plane containing said substantial portion defines an acute angle within the range of about 15 to 75 degrees with the longitudinal axis of the mouthpiece.

23. The improvement of claim 22 wherein said plane containing said substantial portion is about 45 degrees.

* * * * *

UNITED STATES PATENT AND TRADEMARK OFFICE
CERTIFICATE OF CORRECTION

PATENT NO. : 4,764,145

DATED : August 16, 1988

INVENTOR(S) : Richard C. Kirby

It is certified that error appears in the above-identified patent and that said Letters Patent are hereby corrected as shown below:

Column 8, line 21, claim 16, "all" should be --wall--.

Signed and Sealed this

Thirteenth Day of December, 1988

Attest:

DONALD J. QUIGG

*Attesting Officer*  *Commissioner of Patents and Trademarks*